3,025,164
VITAMIN C ENRICHED YOGURT
Joe Metzger, Long Island City, N.Y., assignor to Beatrice Foods Co., Chicago, Ill., a corporation of Delaware
No Drawing. Filed July 27, 1959, Ser. No. 829,552
6 Claims. (Cl. 99—59)

My invention relates to yogurt having a vitamin content, notably vitamin C, in amount to assure that at least 30 milligrams per 8 ounce cup of yogurt will be effective throughout the entire shelf life of the yogurt.

As is well known, yogurt is a product which results from culturing normal milk, partly skimmed milk or skim milk with a conventional yogurt culture usually *Lactobacillus bulgaricus* and *Streptococcus thermophilus* and generally with the exclusion of any other kind of curdling agent. When the yogurt contains less than .3% butterfat, it is denoted as "yogurt cultured skimmed milk"; if it contains between .4% and 2.9% butterfat, it is characterized as "yogurt cultured milk product, 'butterfat partially removed' "; and should it contain not less than 3.0% butterfat, it is "yogurt cultured milk." The yogurt must contain at least .6% acidity expressed in terms of lactic acid.

In addition to, or in lieu of, the milks described above, the yogurt may be made from condensed skim milk, skim milk powder, chocolate milk, cream, whole condensed milk, and whole milk powder and mixtures of the same by the usual yogurt making procedure employing a conventional culture as set forth. Other ingredients include water, sugar, or other sweetener, fruit flavoring, such as orange, as well as standard commercial natural and artificial flavors and certified colors and vitamins.

An 8 ounce sealed cup or paper board container or a wide mouth glass jar container are the presently employed popular commercial packages of yogurt. The product of this invention has initially between about 60 to 100 milligrams sodium ascorbate or ascorbic acid per 8 ounce cup. Preferably, sodium ascorbate is added to the cup with orange flavoring or orange extract at a temperature between about 100° and 120° F. just prior to the addition of the culture and the milk and is dispersed uniformly throughout the finished yogurt. This method insures that at the end of, for example, a two and one-half to three-week shelf life period of the yogurt, it will have available and effective a minimum of at least 30 milligrams of vitamin C in each 8 ounce cup.

That is, the vitamin is so preserved by its environment, i.e. uniform dispersion throughout the yogurt, that during the entire shelf life of the yogurt, the minimum daily requirements for adults (about 30 milligrams) as calculated by the National Research Council, will remain available. The growth of the organism, namely the culture, appears to reduce the oxygen content of the milk so that the vitamin C is not subject to oxidation and it remains substantially stable.

*Example 1*

The yogurt is prepared by blending skim milk, milk solids not fat and cream to form a mixture having about 3.5% milk fat. After the blended milk product has been heated to 185° F., homogenized at 2,000 p.s.i.g., pasteurized at 180° F. for ten minutes and cooled to 110° F., the orange extract containing enough vitamin C in the form of sodium ascorbate is added. Then the milk is inoculated while thus warm with the aforesaid culture, *Lactobacillus bulgaricus* and *Streptococcus thermophilus*. The product is now filled into 8 ounce paper board paper cups, which are then sealed with the usual paper board lid, and the mixture is allowed to incubate at 110° F. to develop an acidity of about .6% to the desired gel strength end point and pH of about 4.2. Thereafter, the capped containers are held in a cold room to inhibit bacterial growth, the temperature being about 38° F.

The amount of orange extract will vary according to the desired taste.

The amount of sodium ascorbate used in the above example will vary to give between 60 and 100 milligrams of vitamin C per 8 ounce cup.

The temperature of the blended milk at the time of introducing the culture will vary between 110° and 115°.

The temperature of incubation will vary between 108° and 113° F., and the pH at the end of this incubation period will vary between pH 4.0 to pH 4.7.

A culture containing about 200 to 250 million of the culture bacteria per cubic centimeter is introduced into the milk.

The temperature of the cold room will vary between about 38° F. and 45° F.

When taken in the morning an 8 ounce container of yogurt prepared as recited above will provide both the daily requirement of vitamin C and a good portion of the daily milk requirements or its equivalent.

Instead of the blend described in the above example, milk having varying fat contents may be used such as normal milk from which 50% of the butterfat has been removed. Also, milk powder reconstituted with water may be used. Condensed skim milk, cream, and concentrated milks also may be employed, as stated.

While I have referred to sodium ascorbate, other sources of vitamin C may be included, such as ascorbic acid and its well known derivatives, but it is found that sodium ascorbate is very useful and effective. The quantity of ascorbic acid or ascorbic acid compound or derivates is critical in that it is important that from about 60 to 100 milligrams of vitamin C per 8 ounces of yogurt be initially incorporated in the yogurt.

As stated, the ascorbic acid or ascorbic acid compound is introduced in a suitable flavor such as orange flavor which is in liquid form, but in addition to the orange extract, other extracts such as lemon, tangerine, grapefruit, lime, vanilla and similar well known extracts may be employed. The citrus extract is usually preferred, and has the desired effect described in this case.

The absence of oxygen appears to preclude oxygen contamination of the vitamin C dispersed throughout the yogurt, which is critical. It is my discovery that the vitamin content can be maintained stable and in effective amount over the entire shelf life of the yogurt by having the yogurt substantantially free of oxygen and by maintaining the vitamin uniformly dispersed as described.

From the foregoing, it will be observed that the sealed 8 ounce container will contain the vitamin C in the form of sodium ascorbate, ascorbic acid or other ascorbic acid derivatives dispersed uniformly in 8 ounces of yogurt characterized by the absence of oxygen in the amount to contaminate the vitamin.

In the appended claims, the term "milk" is used in its broadest sense for convenience in covering the various milks, milk products, and blends of the same.

The above-recited modifications are with respect to Example 1, and, in this connection, there was used in Example 1 2.5% of the yogurt culture. In other examples, I used .5% and 3%, respectively.

I claim:

1. A process of preparing yogurt which comprises introducing to a container from 60 to 100 milligrams of vitamin C per 8 ounces of yogurt to be formed, introducing a milk containing a yogurt producing culture to said container and covering the said vitamin, incubating the milk with said culture to a pH of about 4.0 to 4.7 and producing a vitamin-enriched yogurt in which the vitamin C is uniformly dispersed in the yogurt and is thereby protected from external oxidation and is protected from internal oxidation by the absence of oxygen in the yogurt due to oxygen removal during incubation.

2. The process of claim 1, wherein the vitamin C is introduced in a flavor compound.

3. A process in accordance with claim 2, wherein the flavor compound is an orange extract.

4. A process in accordance with claim 1 wherein the vitamin C is introduced as sodium ascorbate.

5. A process in accordance with claim 1 wherein the incubation proceeds to form a yogurt having a desired gel strength end point and an acidity of at least about 0.6% calculated as lactic acid.

6. A process in accordance with claim 1 wherein the incubation is conducted at elevated temperature to the pH of about 4.0 to 4.7, and thereafter the yogurt is held under reduced temperature.

References Cited in the file of this patent

UNITED STATES PATENTS

| 1,710,133 | Winkler | Apr. 23, 1929 |
| 2,379,586 | Manning | July 3, 1945 |
| 2,824,804 | Mishima | Feb. 25, 1958 |

FOREIGN PATENTS

| 695,603 | Great Britain | Aug. 12, 1953 |

OTHER REFERENCES

"Food and Food Products," vol. II, second edition, by Jacobs, page 855.